United States Patent
Hsu et al.

(10) Patent No.: US 11,662,569 B2
(45) Date of Patent: May 30, 2023

(54) OPTICAL PROCESSING TURNTABLE AND PROJECTION DEVICE

(71) Applicant: Coretronic Corporation, Hsin-Chu (TW)

(72) Inventors: Pi-Tsung Hsu, Hsin-Chu (TW); Chi-Tang Hsieh, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 146 days.

(21) Appl. No.: 17/394,349

(22) Filed: Aug. 4, 2021

(65) Prior Publication Data

US 2022/0099956 A1    Mar. 31, 2022

(30) Foreign Application Priority Data

Sep. 29, 2020    (CN) .......................... 202011047025.9

(51) Int. Cl.
  *G02B 26/00*    (2006.01)
  *H04N 9/31*    (2006.01)

(52) U.S. Cl.
  CPC ......... *G02B 26/008* (2013.01); *H04N 9/3114* (2013.01)

(58) Field of Classification Search
  None
  See application file for complete search history.

(56) References Cited

U.S. PATENT DOCUMENTS

| 2005/0099712 | A1 | 5/2005 | Kao et al. |
| 2015/0062955 | A1 | 3/2015 | Sorg et al. |
| 2017/0123201 | A1* | 5/2017 | Ademan ..................... F21V 9/45 |
| 2017/0307167 | A1 | 10/2017 | Hadrath |

FOREIGN PATENT DOCUMENTS

| CN | 104808273 | 7/2015 |
| CN | 105974717 | 9/2016 |
| CN | 108073024 | 5/2018 |
| CN | 209624967 | 11/2019 |
| CN | 211123606 | 7/2020 |
| DE | 102007013899 | 9/2008 |
| JP | H05144117 | 6/1993 |

(Continued)

OTHER PUBLICATIONS

"Office Action of China Counterpart Application", dated Nov. 2, 2022, p. 1-p. 9.

*Primary Examiner* — Sultan Chowdhury
*Assistant Examiner* — Danell L Owens
(74) *Attorney, Agent, or Firm* — JCIPRNET

(57) ABSTRACT

An optical processing turntable and a projection device are provided. The optical processing turntable has a first mass center and a height. The optical processing turntable includes a substrate and a driving component. The substrate has a second mass center. The driving component is disposed on the substrate to drive the substrate to rotate. The driving component has a locking surface. A distance between the locking surface and one of the first mass center and the second mass center relatively far from the locking surface is less than or equal to ⅔ of the height. The invention can effectively reduce the vibration and noise of the optical processing turntable during high-speed operation, and can increase the operating life of the optical processing turntable.

18 Claims, 16 Drawing Sheets

(56) References Cited

FOREIGN PATENT DOCUMENTS

| | | |
|---|---:|---:|
| JP | H08118267 | 5/1996 |
| JP | 3097094 | 1/2004 |
| JP | 2007037252 | 2/2007 |
| KR | 20020092845 | 12/2002 |
| TW | 201632978 | 9/2016 |
| TW | M549365 | 9/2017 |
| WO | 2019131730 | 7/2019 |

\* cited by examiner

OPTICAL PROCESSING TURNTABLE AND PROJECTION DEVICE

CROSS-REFERENCE TO RELATED APPLICATION

This application claims the priority benefit of China application serial no. 202011047025.9, filed on Sep. 29, 2020. The entirety of the above-mentioned patent application is hereby incorporated by reference herein and made a part of this specification.

TECHNICAL FIELD

This invention relates to a turntable structure and a projection device, and more particularly, to an optical processing turntable and a projection device having the optical processing turntable.

BACKGROUND

In general, a locking surface between a phosphor wheel and an optical engine is disposed on a motor, and a mass center of the phosphor wheel is located between a heat dissipation substrate and the locking surface. When the phosphor wheel rotates at a high speed in the optical engine, there is a distance (CF) between the mass center of the phosphor wheel and the locking surface, and this distance will cause a force arm to cause unstable force on the locking surface. Consequently, the phosphor wheel produces vibration and noise when it rotates at a high speed, which greatly affects the life of the phosphor wheel during long-term operation. In addition, a distance from the mass center of the heat dissipation substrate of the phosphor wheel to the mass center of the phosphor wheel (DC) plus the distance between the mass center of the phosphor wheel and the locking surface (CF) is greater than 90% of an overall height (TF) of the phosphor wheel (i.e., DC+CF>90% TF). It will cause the phosphor wheel to produce greater vibration and noise due to the structural relationship during operation.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY

The invention provides an optical processing turntable and a projection device having the optical processing turntable, which can effectively reduce the vibration and noise during operation, thereby increasing the operating life of the optical processing turntable.

Other objects and advantages of the invention can be further illustrated by the technical features broadly embodied and described as follows.

To achieve one, a part, or all of the objects or other objects, an embodiment of the invention proposes an optical processing turntable having a first mass center and a height. The optical processing turntable includes a substrate and a driving component. The substrate has a second mass center. The driving component is disposed on the substrate to drive the substrate to rotate. The driving component has a locking surface. A distance between the locking surface and one of the first mass center and the second mass center relatively far from the locking surface is less than or equal to ⅔ of the height.

To achieve one, a part, or all of the above objectives or other objectives, an embodiment of the invention proposes a projection device, which includes a light source module, an optical processing turntable, a light valve and a projection lens. The light source module is configured to provide an illumination beam. The optical processing turntable is disposed on a transmission path of the illumination beam. The optical processing turntable has a first mass center and a height, and includes a substrate and a driving component. The substrate has a second mass center. The driving component is disposed on the substrate to drive the substrate to rotate. The driving component has a locking surface. A distance between the locking surface and one of the first mass center and the second mass center relatively far from the locking surface is less than or equal to ⅔ of the height. The light valve is disposed on a transmission path of the illumination beam, and configured to convert the illumination beam into an image beam. The projection lens is disposed on a transmission path of the image beam and configured to convert the image beam into a projection beam.

Based on the above, the embodiments of the invention have at least one of the following advantages and effects. In the design of the optical processing turntable of the invention, the driving component has the locking surface, and the distance between the locking surface and one of the first mass center of the optical processing turntable and the second mass center of the substrate relatively far from the locking surface is less than or equal to ⅔ of the height. In this way, the first mass center of the optical processing turntable and the second mass center of the substrate can be brought closer to the locking surface, and the influences of the force arm on the locking surface caused by the distance between the mass center and the locking surface can be reduced. Accordingly, the vibration and noise of the optical processing turntable during high-speed operation can be effectively reduced, and the operating life of the optical processing turntable can be increased.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
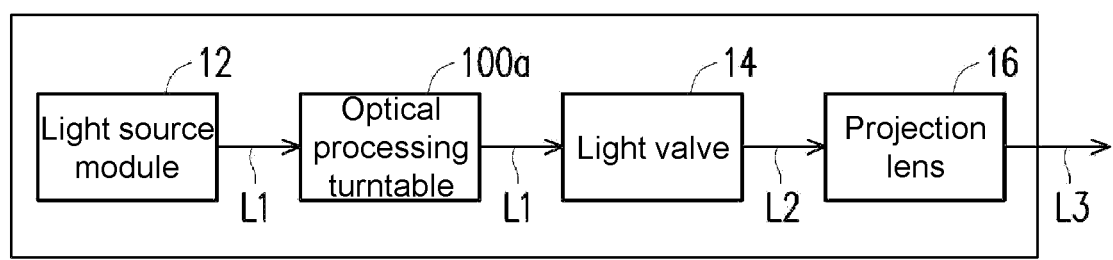
FIG. 1 is a schematic diagram of a projection device according to an embodiment of the invention.

FIG. 1 is a schematic diagram of a projection device according to an embodiment of the invention. Referring to FIG. 1, in this embodiment, a projection device 10 includes a light source module 12, an optical processing turntable 100a, a light valve 14 and a projection lens 16. The light source module 12 is configured to provide an illumination beam L1. The optical processing turntable 100a may be, for example, a phosphor wheel, a color filter wheel or a diffusion wheel, and is disposed on a transmission path of the illumination beam L1. The light valve 14 is disposed on the transmission path of the illumination beam L1, and configured to convert the illumination beam L1 into an image beam L2. The projection lens 16 is disposed on a transmission path of the image beam L2, and configured to covert the image beam L2 into a projection beam L3. For example, the image beam L2 is expanded to form the projection beam L3.

Furthermore, the light source module 12 used in this embodiment is, for example, a laser diode (LD) (e.g., a laser diode bank). Specifically, any light source that meets the volume requirement in actual design can be implemented, and this embodiment is not limited to thereto. The light valve 14 is, for example, a reflective light modulator such as a liquid crystal on silicon panel (LCoS panel), a digital micro-mirror device (DMD) and the like. In an embodiment, the light valve 14 is, for example, a transmissive optical modulator, such as a transparent liquid crystal panel, an electro-optical modulator, a magneto-optical modulator and an acousto-optic modulator, but this embodiment does not limit the form and type of the light valve 14. Enough teaching, suggestion, and implementation illustration for detailed steps and embodiments regarding how the light valve 14 converts the illumination beam L1 into the image beam L2 may be obtained with reference to common knowledge in the related art, which is not repeated hereinafter. In addition, the projection lens 16 includes, for example, a combination of one or more optical lens with refractive powers, such as various combinations among non-planar lenses including a biconcave lens, a biconvex lens, a concavo-convex lens, convexo-convex lens, a plano-convex and a plano-concave lens. In an embodiment, the projection lens 16 may also include a flat optical lens for converting the image beam L2 from the light valve 14 into the projection beam L3 in reflective or transmissive manner to be projected outside the projection device 10. Here, the form and type of the projection lens 16 are not particularly limited by the invention.

Figure 2A:
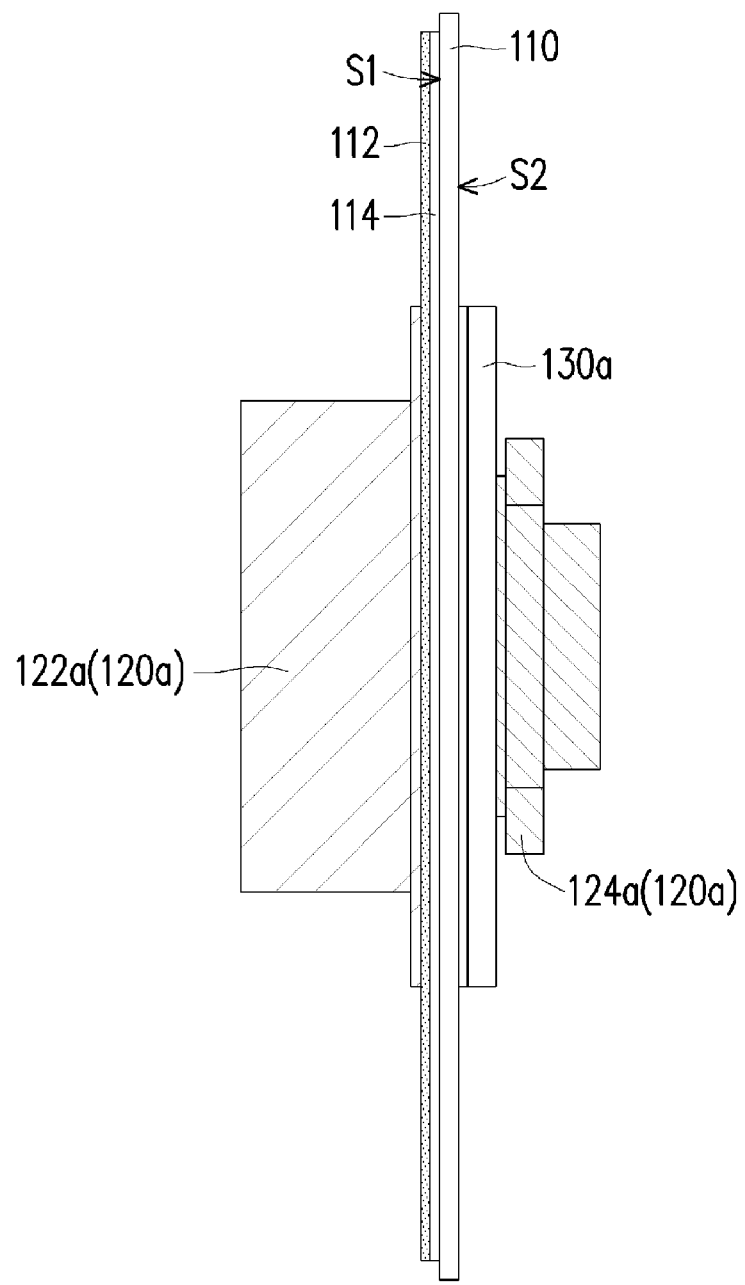
FIG. 2A is a side view of the optical processing turntable of the projection device of FIG. 1.
Figure 2B:
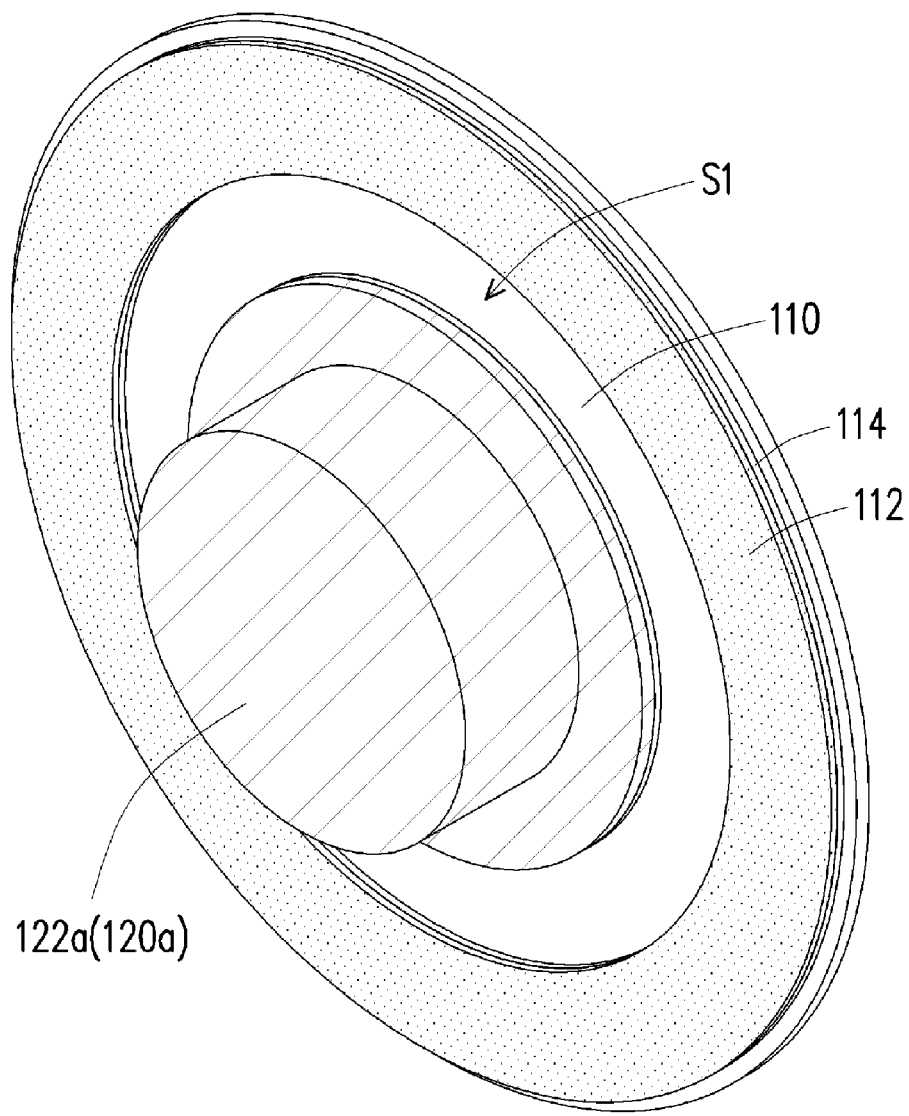
FIG. 2B is a 3D view of the optical processing turntable of FIG. 2A in a viewing angle.
Figure 2C:
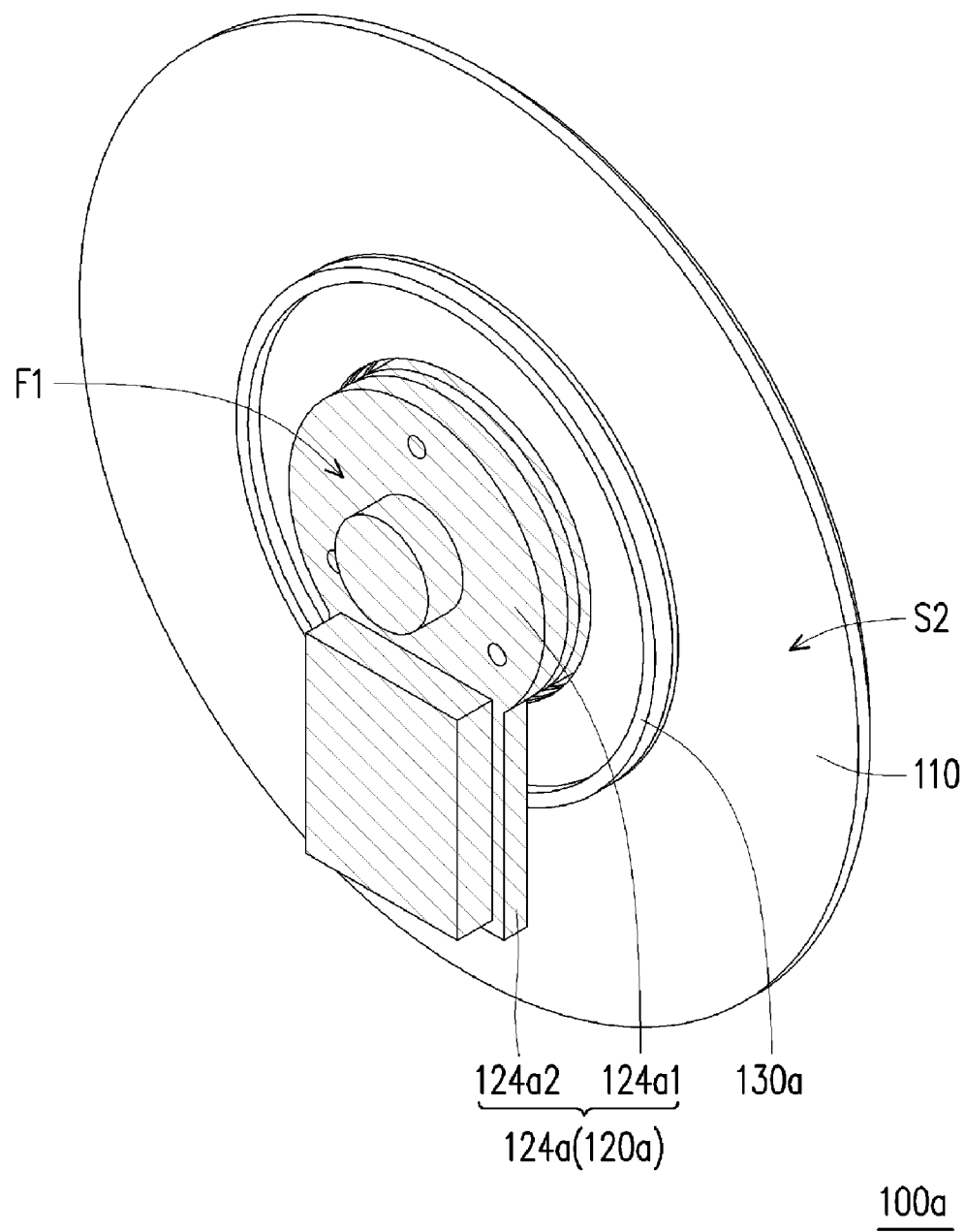
FIG. 2C is a 3D view of the optical processing turntable of FIG. 2A in another viewing angle.
Figure 2D:
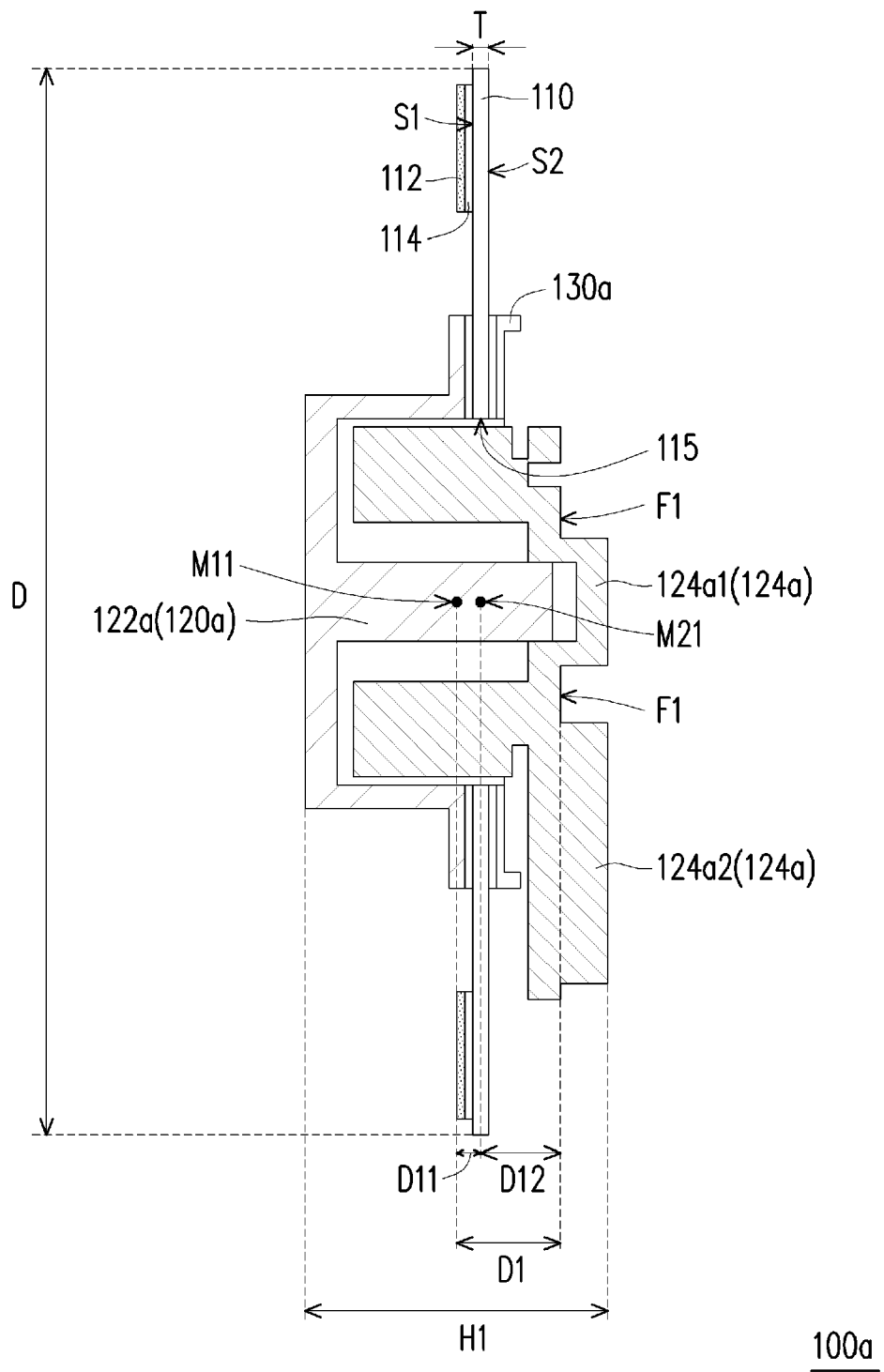
FIG. 2D is a cross-sectional view of the optical processing turntable of FIG. 2A.

FIG. 2A is a side view of the optical processing turntable of the projection device of FIG. 1. FIG. 2B is a 3D view of the optical processing turntable of FIG. 2A in a viewing angle. FIG. 2C is a 3D view of the optical processing turntable of FIG. 2A in another viewing angle. FIG. 2D is a cross-sectional view of the optical processing turntable of FIG. 2A.

Referring to FIG. 2A and FIG. 2D first, in this embodiment, the optical processing turntable 100a includes a substrate 110 and a driving component 120a. The optical processing turntable 100a has a first mass center M11 and an overall height H1, and the substrate 110 includes a second mass center M21. The driving component 120a is disposed on the substrate 110 to drive the substrate 110 to rotate. The driving component 120a has a locking surface F1. In particular, a distance D1 between the locking surface F1 and one of the first mass center M11 and the second mass center M21 relatively far from the locking surface F1 is less than or equal to ⅔ of the overall height H1.

Specifically, referring to FIG. 2A, FIG. 2B, FIG. 2C and FIG. 2D together, the substrate 110 of this embodiment has a first surface S1 and a second surface S2 opposite to each other and a locking hole 115. The driving component 120 includes a rotor 122a and a stator 124a. The rotor 122a is disposed on the first surface S1, and the stator 124a passes through the locking hole 115 from the second surface S2 to be located in the rotor 122a. The stator 124a has the locking surface F1, and the first mass center M11 is located in the rotor 122a. More specifically, referring to FIG. 2C and FIG. 2D, the stator 124a has a locking portion 124a1 and an extending portion 124a2 connecting the locking portion 124a1. The locking portion 124a1 has the locking surface F1, the locking surface F1 is located outside the second surface S2, and the extending portion 124a2 extends onto the second surface S2.

Referring to FIG. 2D, the substrate 110 may be, for example, a phosphor wheel substrate, a color filter wheel substrate or a diffusion wheel substrate. An outer diameter D of the substrate 110 is, for example, equal to 90 mm, and a thickness T of the substrate 110 is, for example, equal to 0.7 mm. In this embodiment, the substrate 110 is, for example, the phosphor wheel substrate, which includes a phosphor layer 112 and a reflective layer 114 disposed on the first surface S1. The reflective layer 114 is located between the phosphor layer 112 and the substrate 110. Here, the substrate 110 is located between the locking surface F1 and the first mass center M11, and the first mass center M11 of the optical processing turntable 100a is farther away from the locking surface F1 than the second mass center M21 of the substrate 110. Accordingly, the distance D1 here is a distance between the first mass center M11 and the locking surface F1, and the distance D1 is less than or equal to ⅔ of the overall height H1 of optical processing turntable 100a. Specifically, the distance D1 is equal to a first distance D11 between the first mass center M11 and the second mass center M21 plus a second distance D12 between the second mass center M21 and the locking surface F1. Further, the phosphor layer 112 receives an excitation beam from the light source module 12.

In addition, referring to FIG. 2A, FIG. 2C and FIG. 2D, the optical processing turntable 100a of this embodiment further includes an adjustment ring 130a. The adjustment ring 130a is sleeved on the rotor 122a, and the substrate 110 is located between the first mass center M11 and the adjustment ring 130a. As shown in FIG. 2B and FIG. 2C, the phosphor layer 112 and the adjustment ring 130a of this embodiment are respectively disposed on two opposite sides of the substrate 110. The shape of the adjusting ring 130 of this embodiment is a hollow ring and is disposed coaxially with the axis of the driving component 120a. Here, a material of the adjusting ring 130 is, for example, a metal, a plastic, a ceramic or a composite material, which is not limited herein.

In brief, the optical processing turntable 100a of this embodiment and the locking surface F1 of a light engine (not shown) are disposed on the driving component 120a, and the distance between the locking surface F1 and one of the first mass center M11 of the optical processing turntable 100a and the second mass center M21 of the substrate 110 relatively far from the locking surface F1 is less than or equal to ⅔ of the overall height H1. Therefore, the first mass center M11 of the optical processing turntable 100a and the second mass center M21 of the substrate 110 can be brought closer to the locking surface F1, and the influences of the force arm on the locking surface F1 caused by the distance between the mass center (i.e., the first mass center M11 and the second mass center M21) and the locking surface F1 can be reduced. Accordingly, the vibration and noise of the optical processing turntable 100a during high-speed operation can be effectively reduced, and the operating life of the optical processing turntable 100a can be increased.

It should be noted that the reference numerals and a part of the contents in the previous embodiment are used in the following embodiments, in which identical reference numerals indicate identical or similar components, and repeated description of the same technical contents is omitted. For a detailed description of the omitted parts, reference can be found in the previous embodiment, and no repeated description is contained in the following embodiments.

Figure 3A:
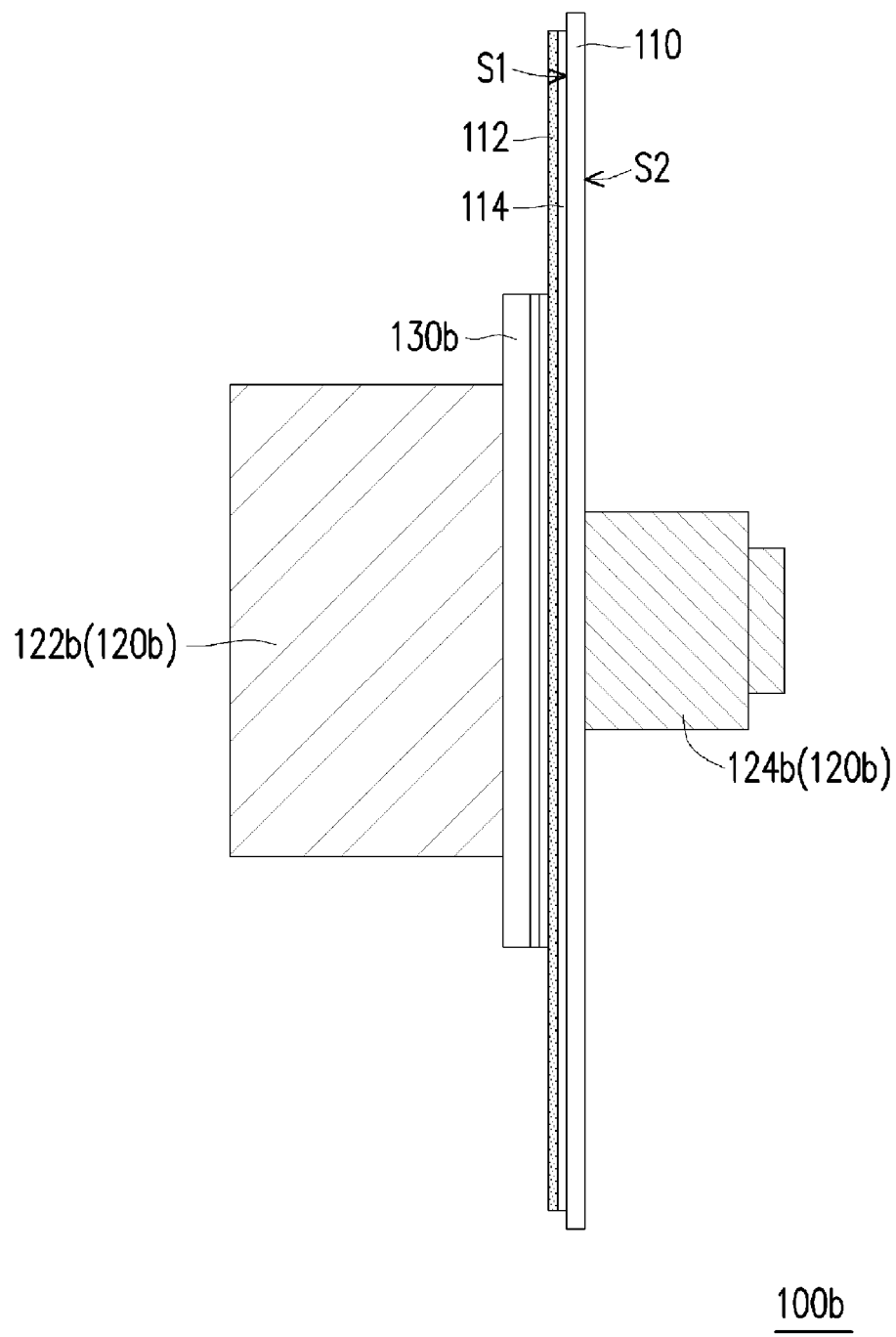
FIG. 3A is a side view of an optical processing turntable according to another embodiment of the invention.
Figure 3B:
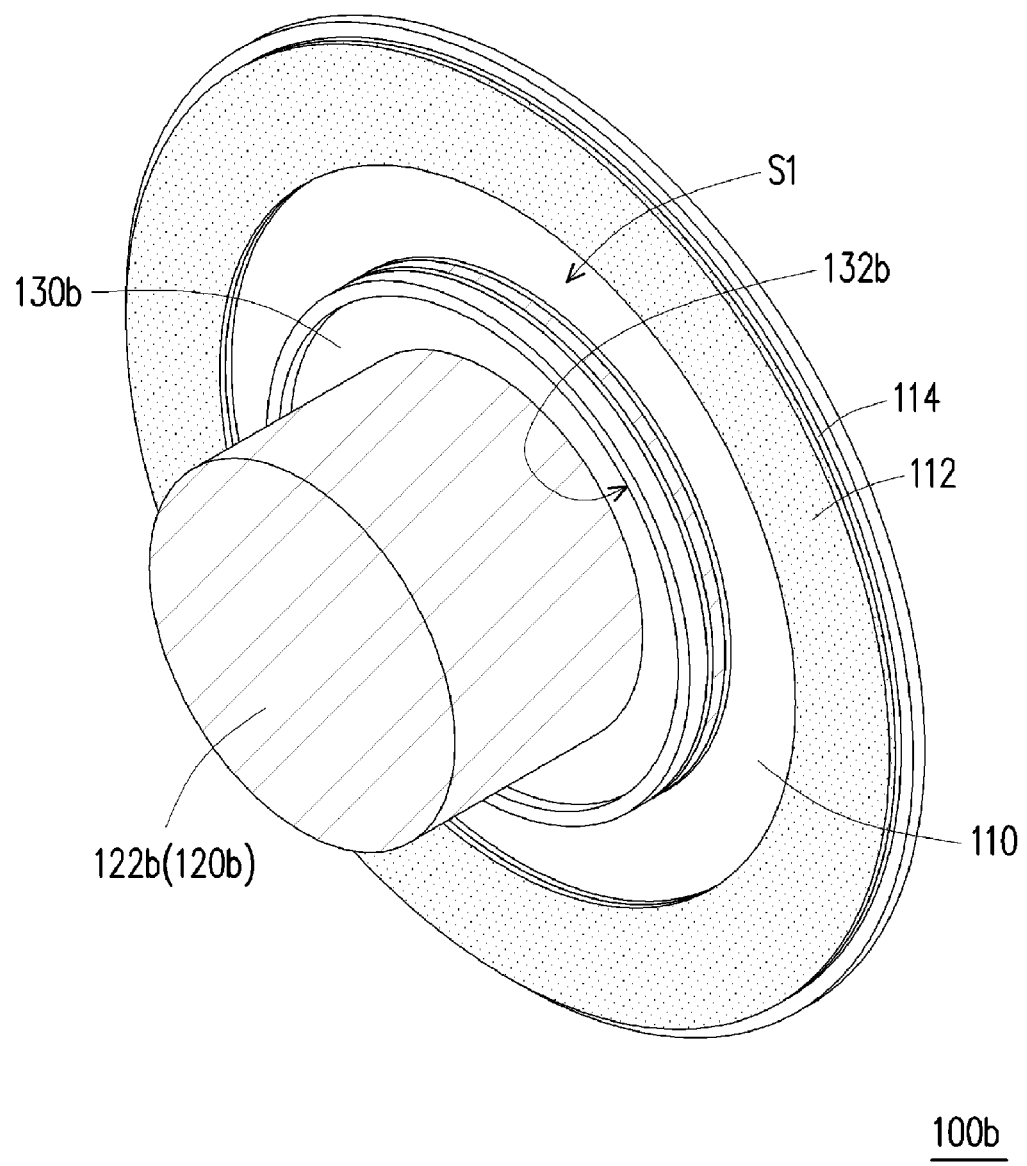
FIG. 3B is a 3D view of the optical processing turntable of FIG. 3A in a viewing angle.
Figure 3C:
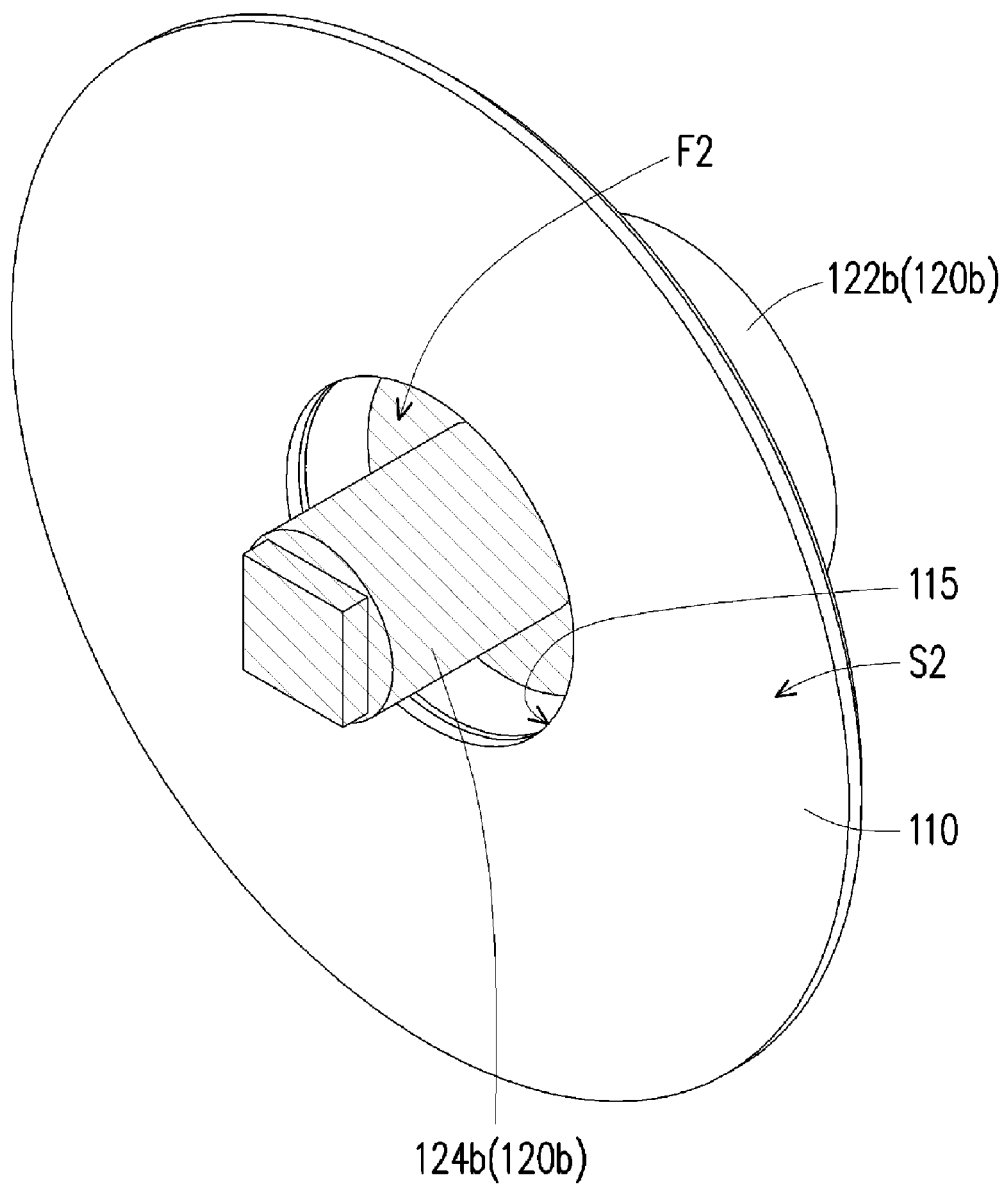
FIG. 3C is a 3D view of the optical processing turntable of FIG. 3A in a viewing angle.
Figure 3D:
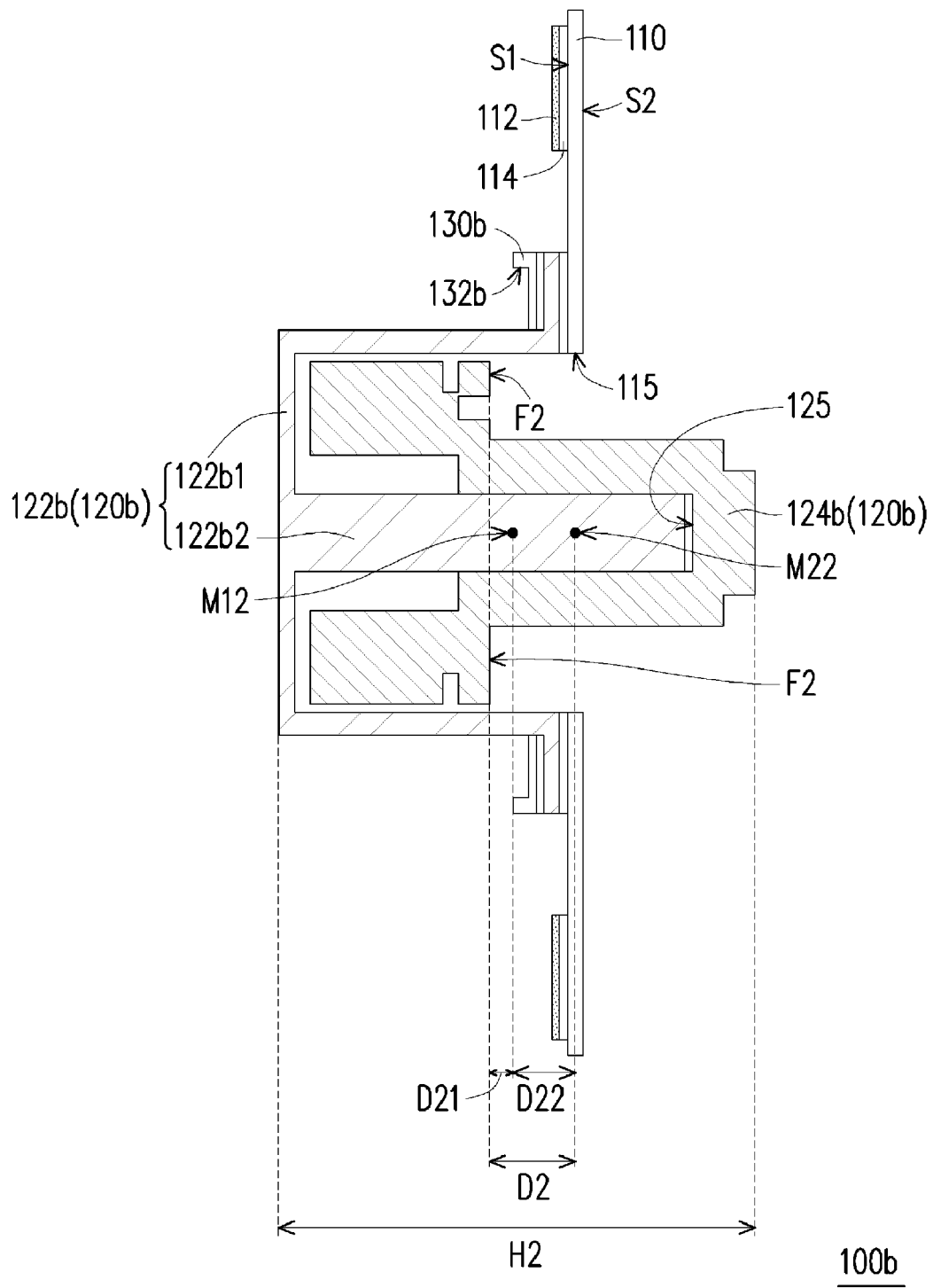
FIG. 3D is a cross-sectional view of the optical processing turntable of FIG. 3A.

FIG. 3A is a side view of an optical processing turntable according to another embodiment of the invention. FIG. 3B is a 3D view of the optical processing turntable of FIG. 3A in a viewing angle. FIG. 3C is a 3D view of the optical processing turntable of FIG. 3A in a viewing angle. FIG. 3D is a cross-sectional view of the optical processing turntable of FIG. 3A.

Referring to FIG. 2D and FIG. 3D together, an optical processing turntable 100b is similar to the optical processing turntable 100a of FIG. 2D, but differs in that, a locking surface F2 of this embodiment is located in a rotor 122b.

Specifically, referring to FIG. 3A, FIG. 3B, FIG. 3C and FIG. 3D together, the rotor 122b of a driving component 120b of this embodiment includes a sleeve 122b1 and a pivot 122b2 connecting the sleeve 122b1. A stator 124b includes a groove 125, and the pivot 122b2 is embedded in the groove 125 and located between the sleeve 122b1 and the stator 124b. Furthermore, an adjustment ring 130b of this embodiment is sleeved on the rotor 122b, and located between a first mass center M12 and the substrate 110. As shown in FIG. 3B, the phosphor layer 112 and the adjustment ring 130b of this embodiment are both disposed on the same side of the substrate 110. Here, the adjustment ring 130b has an accommodating cavity 132b, and a filling material (not shown) can be filled therein to increase a structural balance of the optical processing turntable 100b.

More specifically, referring to FIG. 3D, the first mass center M12 of the optical processing turntable 100b of this embodiment is located between the substrate 110 and the locking surface F2, and a second mass center M22 of the substrate 110 is farther away from the locking surface F2 than the first mass center M12 of the optical processing turntable 100b. Accordingly, a distance D2 here is a distance between the first mass center M22 and the locking surface F2, and the distance D2 is less than or equal to ⅔ of an overall height H2 of optical processing turntable 100b. Here, the distance D2 is equal to a first distance D21 between the locking surface F2 and the first mass center M12 plus a second distance D22 between the first mass center M12 and the second mass center M22. Accordingly, the first mass center M12 of the optical processing turntable 100b and the second mass center M22 of the substrate 110 can be made closer to the locking surface F2. Accordingly, the vibration and noise of the optical processing turntable 100b during high-speed operation can be effectively reduced, and the operating life of the optical processing turntable 100b can be increased.

Figure 4A:
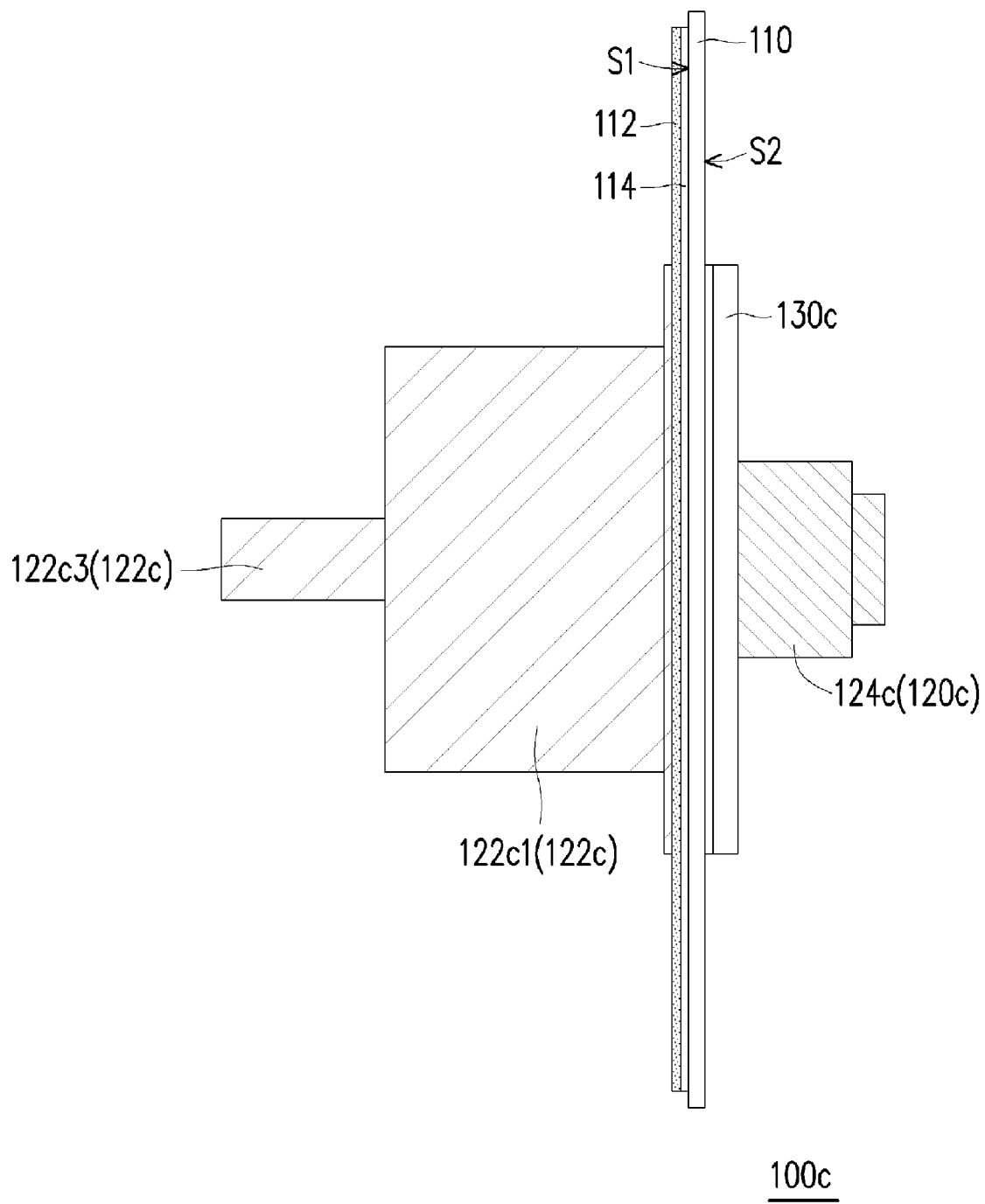
FIG. 4A is a side view of an optical processing turntable according to yet another embodiment of the invention.
Figure 4B:
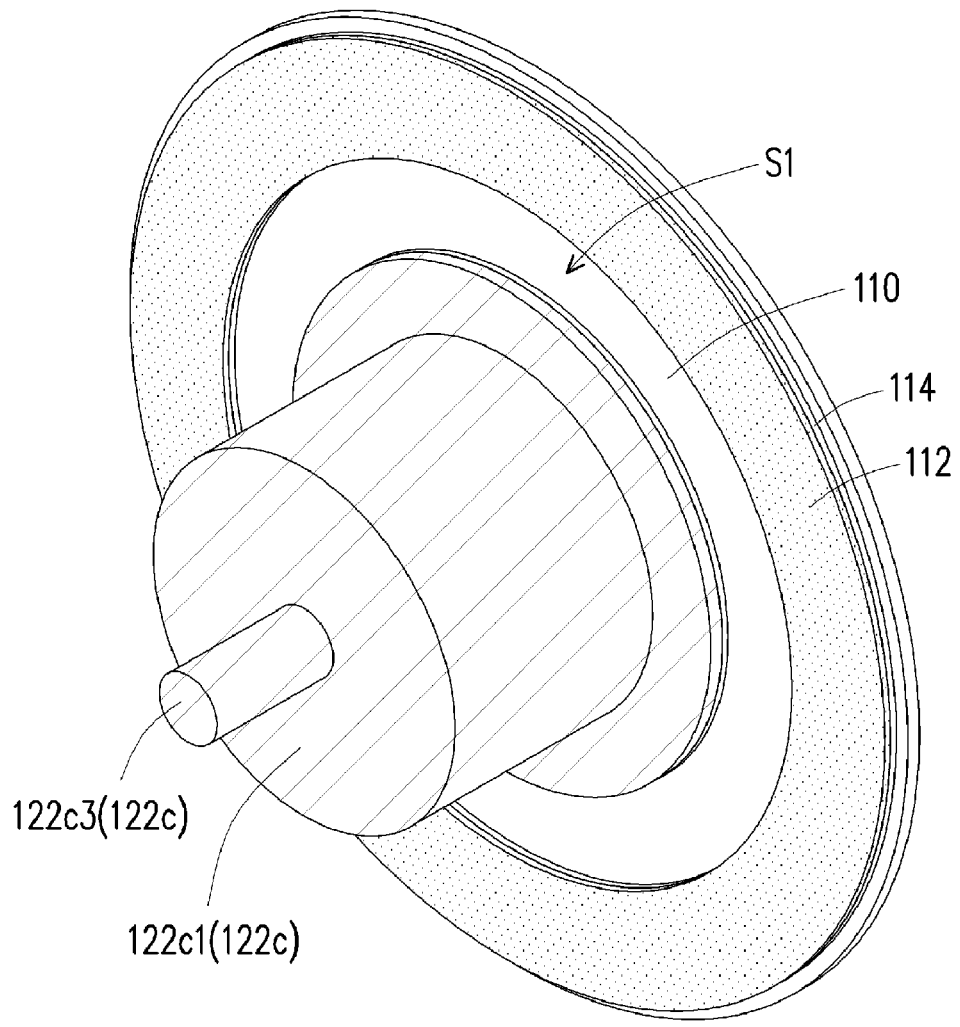
FIG. 4B is a 3D view of the optical processing turntable of FIG. 4A in a viewing angle.
Figure 4C:
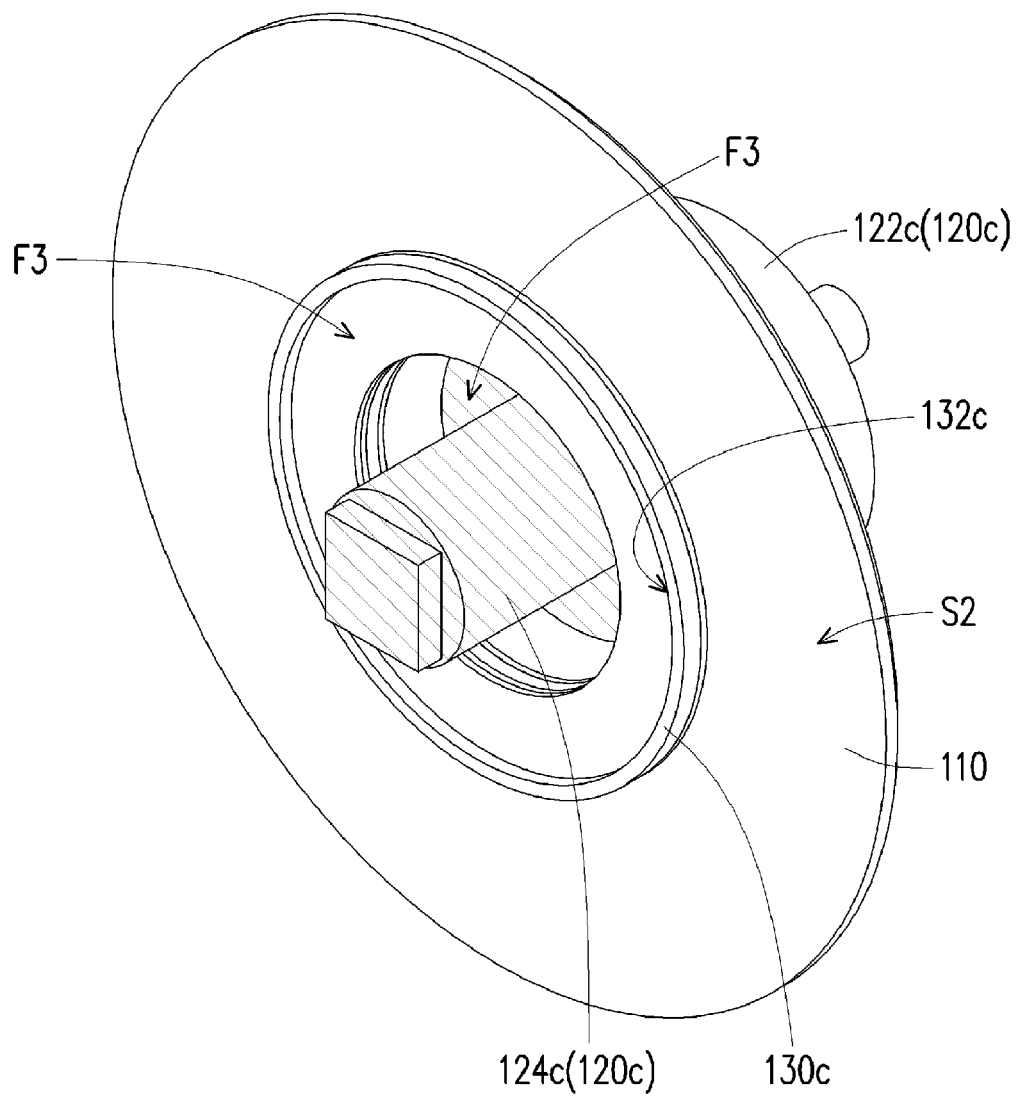
FIG. 4C is a 3D view of the optical processing turntable of FIG. 4A in another viewing angle.
Figure 4D:
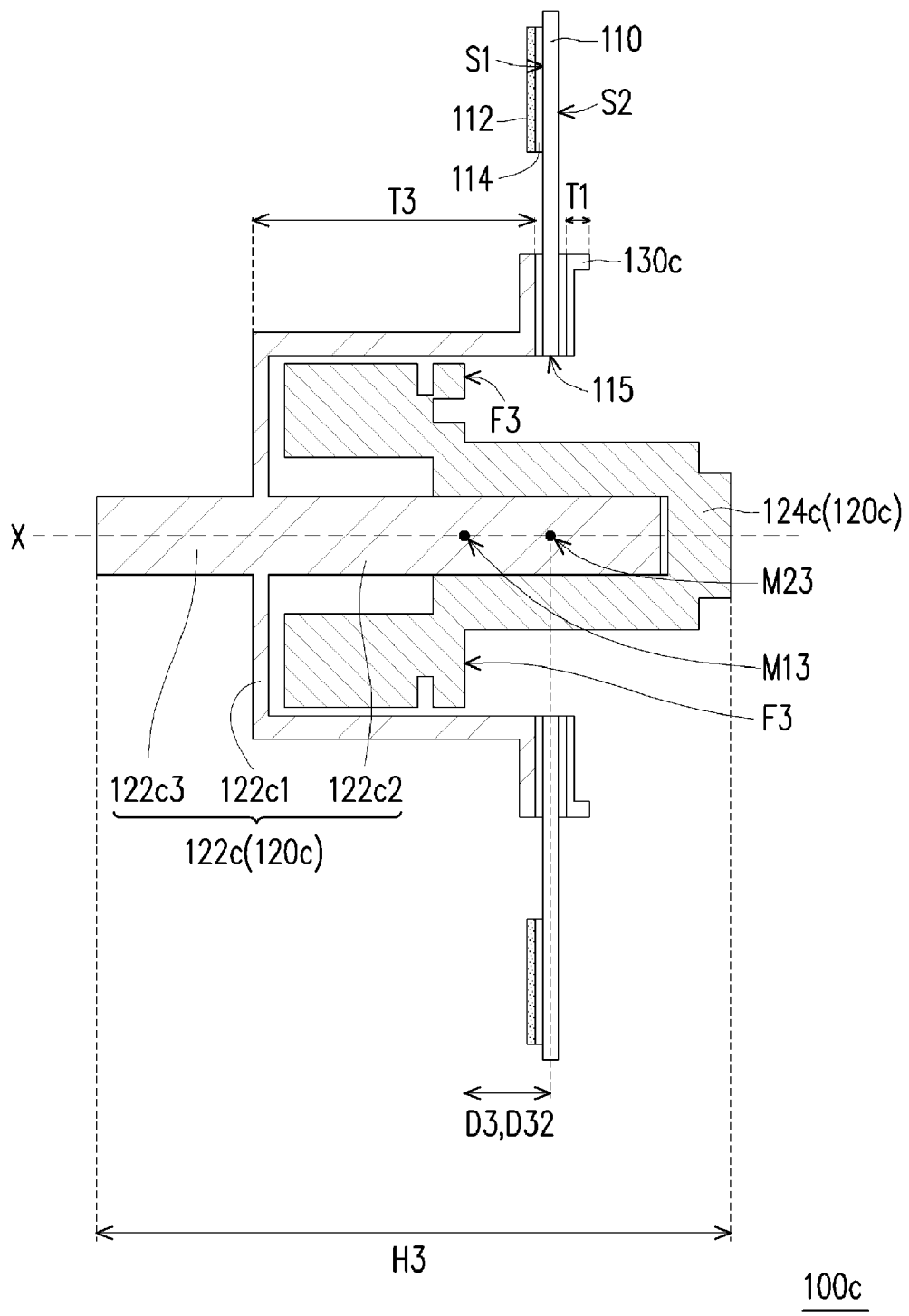
FIG. 4D is a cross-sectional view of the optical processing turntable of FIG. 4A.

FIG. 4A is a side view of an optical processing turntable according to yet another embodiment of the invention. FIG. 4B is a 3D view of the optical processing turntable of FIG. 4A in a viewing angle. FIG. 4C is a 3D view of the optical processing turntable of FIG. 4A in another viewing angle. FIG. 4D is a cross-sectional view of the optical processing turntable of FIG. 4A.

Referring to FIG. 3A, FIG. 4A, FIG. 4B and FIG. 4D together, an optical processing turntable 100c is similar to the optical processing turntable 100b of FIG. 3A, but differs in that, a rotor 122c of a driving component 120c further includes a sub-pivot 122c3, which is disposed outside a sleeve 122c1, and located on the same axis X as a pivot 122c2. Moreover, referring to FIG. 4C, an adjustment ring 130c of this embodiment is sleeved on a stator 124c, and has an accommodating cavity 132c in which a filling material (not shown) can be placed. As shown in FIG. 4B and FIG. 4C, the phosphor layer 112 and the adjustment ring 130c of this embodiment are respectively disposed on two opposite sides of the substrate 110.

More specifically, referring to FIG. 4D, the substrate 110 of this embodiment is located between a first mass center M13 and the adjustment ring 130c, and the first mass center M13 and a locking surface F3 are substantially on the same plane. Therefore, a distance between the locking surface F3 and the first mass center M13 is substantially 0. Thus, a second mass center M23 of the substrate 110 is farther away from the locking surface F3 than the first mass center M13 of the optical processing turntable 100c. Accordingly, a distance D3 here is substantially a distance between the second mass center M23 and the locking surface F3, and may also be a second distance D32 between the first mass center M13 and the second mass center M23. The distance D3 is less than or equal to ⅔ of the overall height H3 of optical processing turntable 100c. Accordingly, the first mass center M13 of the optical processing turntable 100c and the second mass center M23 of the substrate 110 can be made closer to the locking surface F3. Accordingly, the vibration and noise of the optical processing turntable 110c during high-speed operation can be effectively reduced, and the operating life of the optical processing turntable 100c can be increased.

Figure 5A:
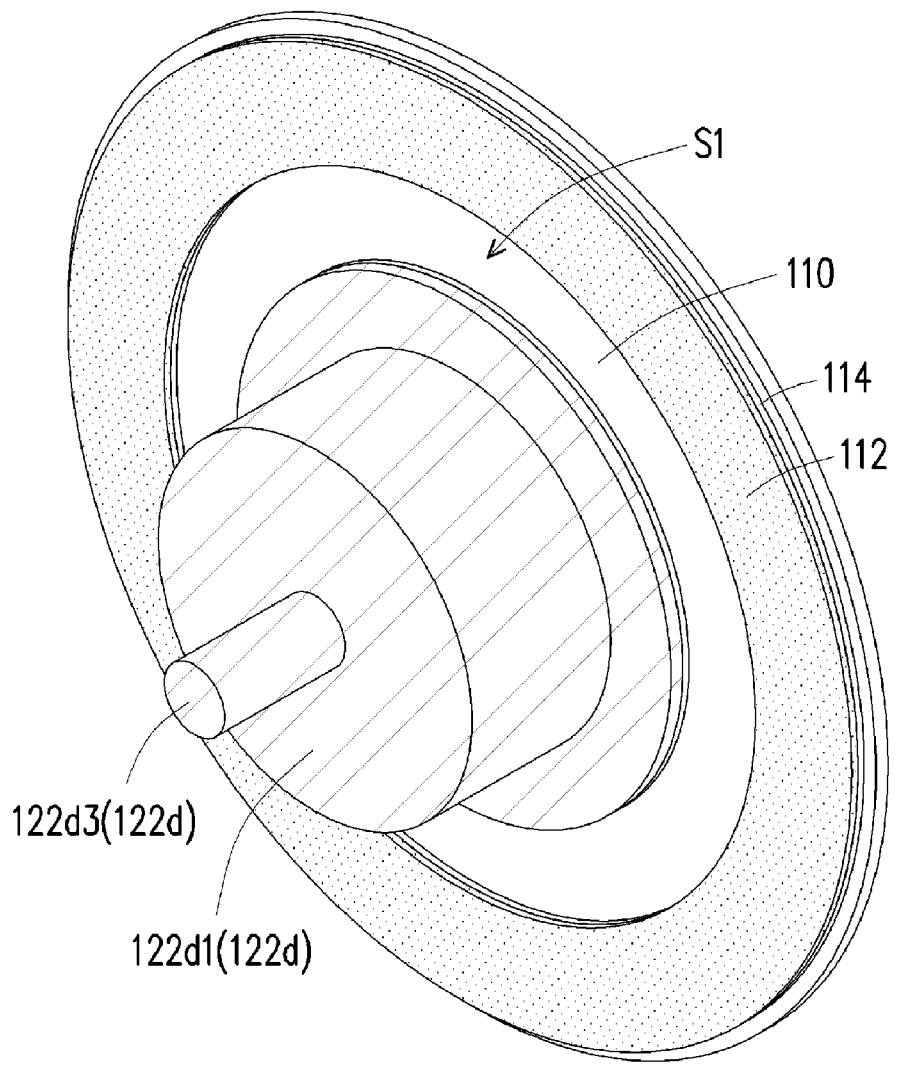
FIG. 5A is a 3D view of an optical processing turntable in a viewing angle according to still another embodiment of the invention.
Figure 5B:
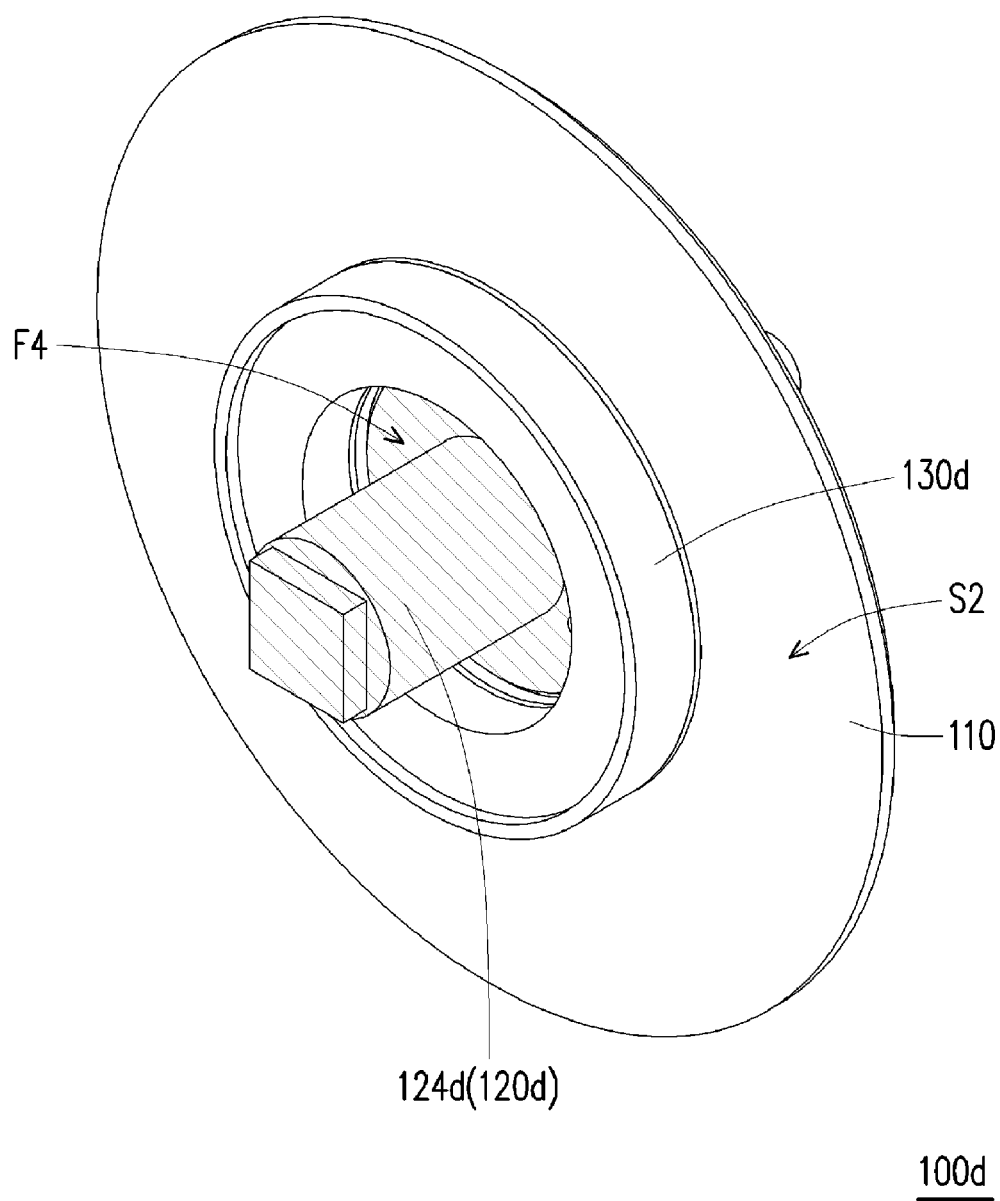
FIG. 5B is a 3D view of the optical processing turntable of FIG. 5A in another viewing angle.
Figure 5C:
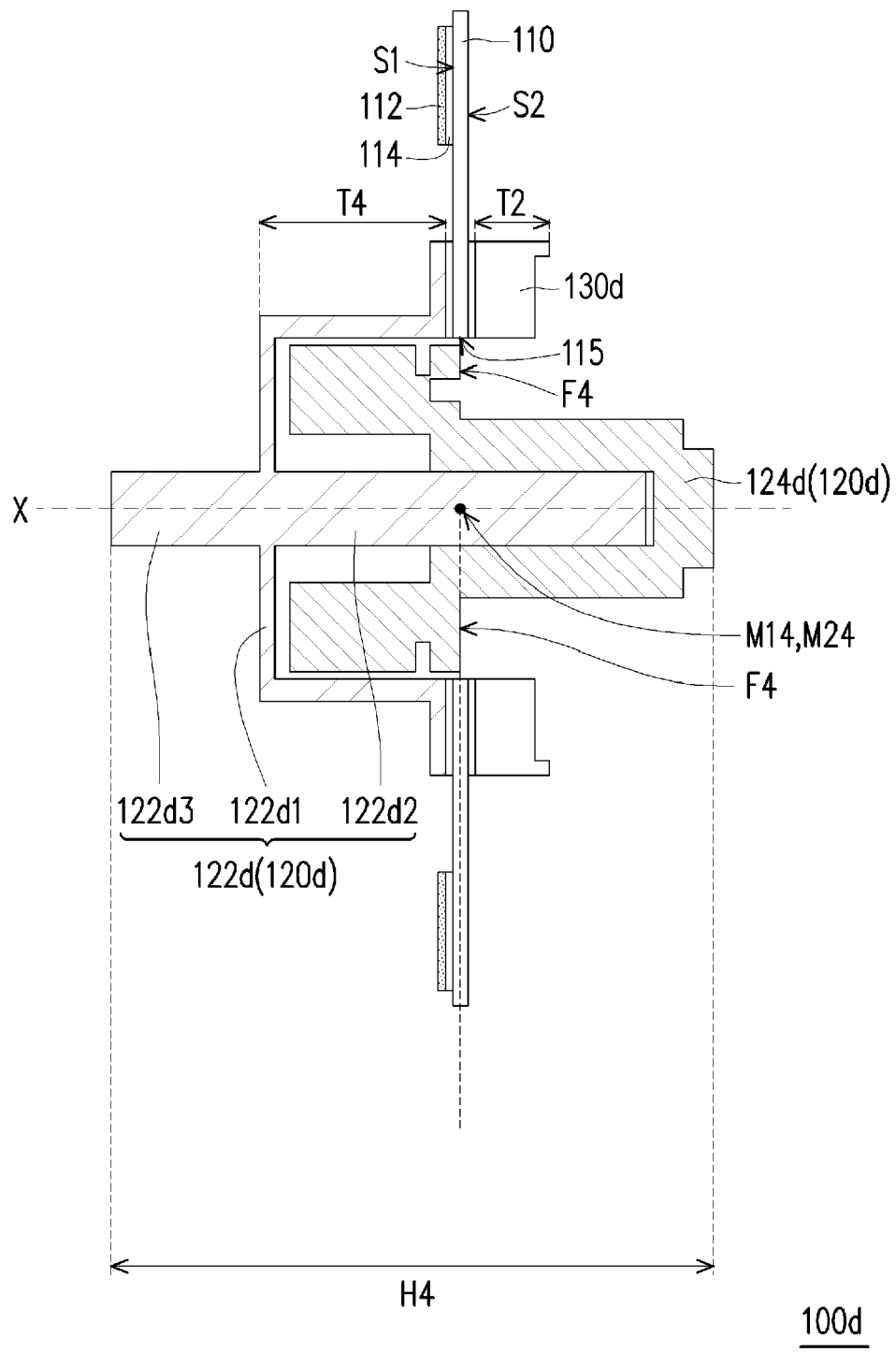
FIG. 5C is a cross-sectional view of the optical processing turntable of FIG. 5A.

FIG. 5A is a 3D view of an optical processing turntable in a viewing angle according to still another embodiment of the invention. FIG. 5B is a 3D view of the optical processing turntable of FIG. 5A in another viewing angle. FIG. 5C is a cross-sectional view of the optical processing turntable of FIG. 5A.

Referring to FIG. 4D and FIG. 5C together, an optical processing turntable 100d is similar to the optical processing turntable 100c of FIG. 4D, but differs in that, a thickness T2 of an adjustment ring 130d of this embodiment is greater than the thickness T1 of the adjustment ring 130c of FIG. 4D, and a thickness T4 of a sleeve 122d1 of a rotor 122d is less than a thickness T3 of the sleeve 122c1 of the rotor 122c of FIG. 4D.

More specifically, referring to FIG. 5A, FIG. 5B and FIG. 5C, in this embodiment, a rotor 122d of a driving component 120d further includes a sub-pivot 122d3, which is disposed outside a sleeve 122d1, and located on the same axis X as a pivot 122d2. An adjustment ring 130d is sleeved on a stator 124d of the driving component 120d, and the phosphor layer 112 and the adjustment ring 130d are respectively disposed on two opposite sides of the substrate 110. As shown in FIG. 5C, a first mass center M14 of the optical processing turntable 100d, a second mass center M24 of the substrate 100 and a locking surface F4 are located on the same plane. In other words, a distance from the first mass center M14 to the locking surface F4 is equal to 0, a distance from the second mass center M24 to the locking surface F4 is equal to 0, and a distance from the first mass center M14 to the second mass center M24 is also 0. In the above configuration, a distance between the locking surface F4 and one of the first mass center M14 and the second mass center M24 relatively far from the locking surface F4 is less than or equal to ⅔ of an overall height H4. Accordingly, the vibration and noise of the optical processing turntable 110d during high-speed operation can be effectively reduced, and the operating life of the optical processing turntable 100d can be increased.

In summary, the embodiments of the invention have at least one of the following advantages and effects. In the design of the optical processing turntable of the invention, the driving component has the locking surface, and the distance between the locking surface and one of the first mass center of the optical processing turntable and the second mass center of the substrate relatively far from the locking surface is less than or equal to ⅔ of the overall height. In this way, the first mass center of the optical processing turntable and the second mass center of the substrate can be brought closer to the locking surface, and the influences of the force arm on the locking surface caused by the distance between the mass center and the locking surface can be reduced. Accordingly, the vibration and noise of the optical processing turntable during high-speed operation can be effectively reduced, and the operating life of the optical processing turntable can be increased.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

The invention claimed is:

1. An optical processing turntable, the optical processing turntable having a first mass center and a height, the optical processing turntable comprising a substrate and a driving component, wherein:
   the substrate has a second mass center; and
   the driving component is disposed on the substrate to drive the substrate to rotate, and the driving component has a locking surface, wherein a distance between the locking surface and one of the first mass center and the second mass center relatively far from the locking surface is less than or equal to ⅔ of the height.

2. The optical processing turntable of claim 1, wherein the driving component comprises a rotor and a stator, the stator has the locking surface, and the first mass center is located in the rotor.

3. The optical processing turntable of claim 2, wherein the substrate has a first surface and a second surface opposite to each other and a locking hole, the rotor is disposed on the first surface, the stator passes through the locking hole from the second surface to be located in the rotor, the stator has a locking portion and an extending portion connecting the locking portion, the locking portion has the locking surface, the locking surface is located outside the second surface, and the extending portion extends onto the second surface.

4. The optical processing turntable of claim 3, wherein the substrate is located between the locking surface and the first mass center.

5. The optical processing turntable of claim 4, wherein the distance is equal to a first distance between the first mass center and the second mass center plus a second distance between the second mass center and the locking surface.

6. The optical processing turntable of claim 5, wherein at least one of the first distance and the second distance is equal to 0.

7. The optical processing turntable of claim 4, further comprising:
   an adjustment ring, sleeved on the rotor, the substrate being located between the first mass center and the adjustment ring.

8. The optical processing turntable of claim 2, wherein the substrate has a first surface and a second surface opposite to each other and a locking hole, the rotor is disposed on the first surface, the stator passes through the locking hole from the second surface to be located in the rotor, and the locking surface is located in the rotor.

9. The optical processing turntable of claim 8, wherein the first mass center is located between the substrate and the locking surface.

10. The optical processing turntable of claim 9, wherein the distance is equal to a first distance between the locking surface and the first mass center plus a second distance between the first mass center and the second mass center.

11. The optical processing turntable of claim 10, wherein at least one of the first distance and the second distance is equal to 0.

12. The optical processing turntable of claim 9, wherein the rotor comprises a sleeve and a pivot connecting the sleeve, the stator has a groove, and the pivot is embedded in the groove and located between the sleeve and the stator.

13. The optical processing turntable of claim 12, further comprising:
   an adjustment ring, sleeved on the rotor, and located between the first mass center and the substrate.

14. The optical processing turntable of claim 9, wherein the rotor further comprises a sub-pivot disposed outside the sleeve and located on the same axis as the pivot.

15. The optical processing turntable of claim 14, further comprising:
   an adjustment ring, sleeved on the stator, wherein the substrate is located between the first mass center and the adjustment ring.

16. The optical processing turntable of claim 1, wherein the substrate comprises a phosphor wheel substrate, a color filter wheel substrate or a diffusion wheel substrate.

17. The optical processing turntable of claim 1, wherein an outer diameter of the substrate is equal to 90 mm, and a thickness of the substrate is equal to 0.7 mm.

18. A projection device, the projection device comprising a light source module, an optical processing turntable, a light valve and a projection lens, wherein
   the light source module is configured to provide an illumination beam,
   the optical processing turntable is disposed on a transmission path of the illumination beam, and the optical processing turntable has a first mass center and a height, and comprises a substrate and a driving component, wherein:
      the substrate has a second mass center; and
      the driving component is disposed on the substrate to drive the substrate to rotate, and the driving component has a locking surface, wherein a distance between the locking surface and one of the first mass center and the second mass center relatively far from the locking surface is less than or equal to ⅔ of the height;
   the light valve is disposed on a transmission path of the illumination beam and configured to convert the illumination beam into an image beam; and
   the projection lens is disposed on a transmission path of the image beam and configured to convert the image beam into a projection beam.

* * * * *